(12) United States Patent
Gagliardi et al.

(10) Patent No.: US 11,417,073 B2
(45) Date of Patent: Aug. 16, 2022

(54) SYSTEM AND METHOD FOR GENERATING HIERARCHICAL LEVEL-OF-DETAIL MEASUREMENTS FOR RUNTIME CALCULATION AND VISUALIZATION

(71) Applicant: Cesium GS, Inc., Philadelphia, PA (US)

(72) Inventors: Peter Gagliardi, Springfield, PA (US); Joshua Lawrence, Media, PA (US); Sean Lilley, Philadelphia, PA (US); Eli Bogomolny, Philadelphia, PA (US); Ian Lilley, Philadelphia, PA (US); Zakiuddin Shehzan Ayub Mohammed, King Of Prussia, PA (US); Patrick Cozzi, Drexel Hill, PA (US)

(73) Assignee: CESIUM GS, INC., Philadelphia, PA (US)

( * ) Notice: Subject to any disclaimer, the term of this patent is extended or adjusted under 35 U.S.C. 154(b) by 0 days.

(21) Appl. No.: 17/377,233

(22) Filed: Jul. 15, 2021

(65) Prior Publication Data
US 2022/0020225 A1 Jan. 20, 2022

Related U.S. Application Data

(60) Provisional application No. 63/052,864, filed on Jul. 16, 2020.

(51) Int. Cl.
*G06T 19/20* (2011.01)
*G06T 19/00* (2011.01)
(Continued)

(52) U.S. Cl.
CPC .............. *G06T 19/20* (2013.01); *G06F 16/51* (2019.01); *G06T 17/20* (2013.01); *G06T 19/003* (2013.01);
(Continued)

(58) Field of Classification Search
CPC ....... G06T 19/003; G06T 19/20; G06T 17/20; G06T 2210/36; G06T 2219/2004; G06F 16/51
See application file for complete search history.

(56) References Cited

U.S. PATENT DOCUMENTS 6,288,730 B1 * 9/2001 Duluk, Jr. ................. G06T 1/60
345/568
7,366,736 B1 * 4/2008 Woodard ................ G06T 17/05
707/999.101

(Continued)

*Primary Examiner* — Daniel F Hajnik
(74) *Attorney, Agent, or Firm* — The Marbury Law Group, PLLC

(57) ABSTRACT

Systems, methods, devices, and non-transitory media of the various embodiments enable generating at least one hierarchical-level-of-detail (LOD) data structure in order to visualize and traverse measurement data associated with a three-dimensional (3D) model. In various embodiments, generating at least one hierarchical LOD data structure may include establishing a background grid comprising a mathematical grid structure defined in a common coordinate system, building a layout comprising an intermediary data structure, computing measurement data for each tile based at least in part on the height data samples, and storing at least a portion of the computed measurement data for each tile in a metadata file.

25 Claims, 16 Drawing Sheets

(51) Int. Cl.
*G06F 16/51* (2019.01)
*G06T 17/20* (2006.01)
(52) U.S. Cl.
CPC .. *G06T 2210/36* (2013.01); *G06T 2219/2004* (2013.01)

(56) References Cited

U.S. PATENT DOCUMENTS

| | | | | |
|---|---|---|---|---|
| 8,390,623 | B1* | 3/2013 | Guskov | G06T 19/00 345/428 |
| 2006/0146053 | A1* | 7/2006 | Gatewood, Jr. | G06T 19/00 345/440 |
| 2011/0316854 | A1* | 12/2011 | Vandrovec | G06T 17/20 345/420 |
| 2013/0195352 | A1* | 8/2013 | Nystad | H04N 19/197 382/166 |
| 2013/0321399 | A1* | 12/2013 | Rohlf | G06T 17/05 345/419 |
| 2015/0370828 | A1* | 12/2015 | Maurer | G01C 21/32 707/722 |
| 2017/0356753 | A1* | 12/2017 | Findley | G08G 1/096827 |

\* cited by examiner

SYSTEM AND METHOD FOR GENERATING HIERARCHICAL LEVEL-OF-DETAIL MEASUREMENTS FOR RUNTIME CALCULATION AND VISUALIZATION

RELATED APPLICATIONS

This application claims priority to U.S. Provisional Application No. 63/052,864, filed on Jul. 16, 2020, entitled "Systems and Methods for Generating Hierarchical Level-of-Detail Measurements for Runtime Calculation and Visualization," the entire contents of which are hereby incorporated by reference.

BACKGROUND

Computer graphics, and especially three-dimensional visualization, is a rapidly developing computing technology finding new applications in many different industries, including geospatial, defense, and entertainment. Such applications may benefit from computations that able to compare multiple overlapping height sources. For example, in civil engineering applications, comparing heights between the terrain of a construction site on multiple days, which may involve computing elevation, volume difference, slope, and other types of measurements.

One challenge faced in three-dimensional visualization is the complicated nature of three-dimensional objects. Three-dimensional objects generally are formed from a geometry, often a set of triangles (i.e., a triangle mesh), and textures, often a set of two-dimensional images. A higher quality three-dimensional object often includes large amounts of data that can be spread out over many file locations. As such, high quality three-dimensional objects can be difficult to render.

Massive mesh datasets can be difficult to work with due to the large amount of data that needs to be loaded, possibly over a network, and then processed, such as when rendered to a display. Applications that operate on massive mesh datasets use a hierarchical level-of-detail (LOD) structure for the dataset, in which a large-area, but low-detail simplification of the model is placed at the highest level of the hierarchy as a tile, followed by subsequently higher-detail but smaller-area children tiles.

Efficient creation of hierarchical LODs for massive mesh datasets can be difficult for the same reason as rendering. That is, calculations must be sufficiently fast for a program to be useful to a user. Therefore, the various embodiments provide methods of pre-computing such measurements and storing in a specialized data structure that stores calculations in a quickly-accessible format, which is structured in a way that the data can be visualized in a computer graphics application that provides good performance.

SUMMARY

The systems, methods, devices, and non-transitory media of the various embodiments may enable generating at least one hierarchical-level-of-detail (LOD) data structure for measurement data associated with a three-dimensional (3D) model. Methods according to various embodiments may include establishing a background grid comprising a mathematical grid structure defined in a common coordinate system, building a layout comprising an intermediary data structure, computing measurement data for each tile based at least in part on the height data samples, and storing at least a portion of the computed measurement data for each tile in a metadata file. In some embodiments, the layout may provide a grid view and a hierarchical view of tiles. In some embodiments, each tile may represent a rectangle of height data samples aligned with the background grid.

In some embodiments, the generated at least one hierarchical LOD data structure may be configured to enable visualizing the computed measurements in a 3D rendering engine. In some embodiments, the at least one hierarchical LOD data structure may include a plurality of LOD data structures that are configured to be aligned. Embodiment methods may further include comparing the plurality of LOD data structures, and computing derived measurements from the plurality of LOD data structures. In some embodiments, computing the measurement data for each tile may include storing at least one of textures or vertex attributes for the hierarchical LOD data structure.

Embodiment methods may further include applying one or more compression techniques to the computed measurement data. In some embodiments, the at least one hierarchical LOD data structure may include two or more LOD data structures. In some embodiments, computing the measurement data for each tile may include computing measurements at an intersection of the two or more LOD data structures. Embodiment methods may further include creating a new measurement layer or a new hierarchical LOD data structure of the computed measurement data at the intersection.

In some embodiments the measurements at the intersection of the two or more LOD data structures may be performed offline or at runtime. Embodiment methods may further include combining the computed measurements at the intersection of the two or more LOD data structures with a sub-region measurement. In some embodiments, the two or more LOD data structures may be associated with different time periods.

Embodiment methods may further include, for rendering at least a portion of the 3D model, receiving a request for calculating a measurement associated with the portion of the 3D model, identifying one or more relevant tiles associated with the portion of the 3D model, selecting data from texture data or vertex attributes of the identified one or more relevant tile, and returning the selected data.

Embodiment methods may further include rendering the selected data overlaid with the 3D model. In some embodiments, receiving the request, identifying the one or more relevant tile, selecting the data, and returning the selected data may be performed prior to runtime for rendering the portion of the 3D model.

Various embodiments include a device including a processor configured with processor-executable instructions to perform operations of any of the methods summarized above. Various embodiments also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
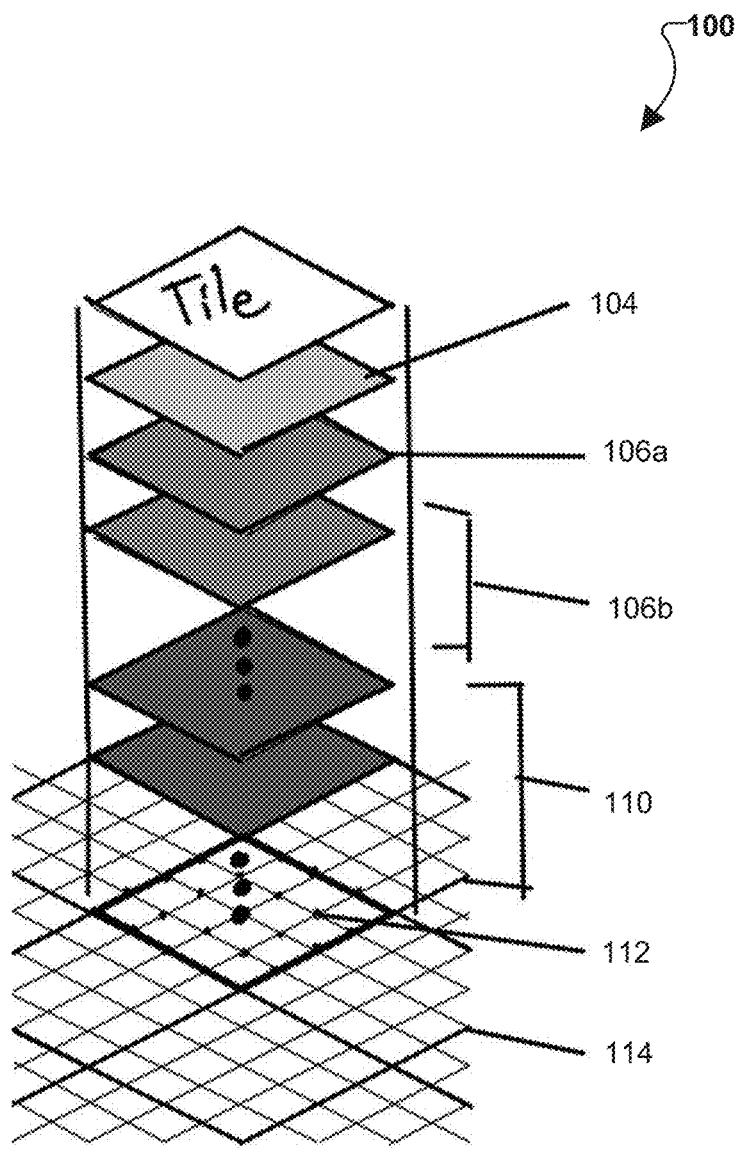
FIG. 1A illustrates various data layers in an example representation of a Tile according to various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

In various embodiments, a program referred to herein as a "Tiler" program, may be employed to perform calculations and compute measurement data from height data, and store such calculations and measurement data in a Hierarchical level-of-detail (LOD) model referred to herein as a "Tileset." The Tileset according to various embodiments may be efficient both for looking up calculation results and for visualizing results in a 3D rendering engine.

Various embodiments may use a Background Grid approach, which allows Tilesets to be aligned for purposes of comparison or computing derived measurements. The term "Height Source" is used herein to refer to a dataset that that contains information of the height at various points in space. In various embodiments, the dataset may take various forms, such as a three-dimensional (3D) mesh data structure or raster image file. The term "Height Array" is used herein to refer to a 2D array containing height information sampled from a Height Source. Specifically, in various embodiments a single Height Array may represent a small region of space corresponding to a single Tile.

In various embodiments, measurement data computed by the Tiler may include Grid Values or Aggregate Values, computed from one or more Height Sources.

The term "Grid Values" as used herein refers to a collection of computation results that represent data samples across a 2D grid, and which may be represented either by Vertex Attributes (i.e., any data associated with a single vertex of a 3D model) or Textures (i.e., grid data stored as colors of an image).

The term "Aggregate Value" as used herein refers to the result of a computation that combines many values into one value. Such as computing a sum or average of a number of data points.

In various embodiments, applying a hierarchical LOD model to measurements may enable visualizing coarse summaries of data. Further, storing calculations as Grid Values may allow for value picking; that is, finding a calculated value under the mouse cursor. In various embodiments, value picking may be used for interactive applications to inspect parts of the data.

A mesh dataset with a single material may include triangles of indexed vertices, all of which may share the same attributes. Attributes may include, but are not limited to, positions, texture coordinates, surface normal, vertex color, skinning weights, etc. In some embodiments, calculations may be stored as Vertex Attributes, allowing for greater flexibility of data representation. For example, image formats for certain rendering engines or 3D models may only support RGBA color channels as unsigned byte values. In some embodiments, Vertex Attributes may be able to store general data types, for example, floating point decimals, vectors, matrices, or combinations thereof. Textures are often used in computer graphics to increase the detail of information on the surface of triangle meshes (also referred to as simply "meshes" herein). Surface information may include base color, static light color/intensity, influence weight for deformation algorithms, and parameters for shading algorithms, such as bump mapping or subsurface scattering.

In some embodiments, calculations may be stored as Textures, and modern texture compression algorithms may be used to store data more efficiently. For example, while lossy compression methods provide efficient storage, they may introduce error in the calculations. Alternatively, lossless compression methods ensure calculations are stored without any error, but at a relatively larger file size. In various embodiments, lossy and lossless compression methods may be combined, as full-resolution tiles may be stored with a lossless compression method to maximize accuracy, and lower resolution tiles stored with a lossy compression to maximize rendering efficiency.

The LOD structure may allow for efficient, progressive rendering. Therefore, the Tileset generated according to various embodiments may also be used for additional computer graphics purposes, such as drawing 3D graphics primitives draped over the Tileset, using the Geometry of each Tile like terrain. The term "Geometry" as used herein refers computer graphics data for describing a 3D model of a single Tile, the content of which may include vertices, texture coordinates, face normal, and any other data necessary to render the model in a computer graphics application as desired. That is, when the computer graphics application is first loading, a few low-resolution LOD tiles may be rendered, as graphics primitives rendered on such tiles represent a coarse visualization that can be rendered very quickly to keep the user interface responsive. As more tiles load, higher resolution Tiles may replace the lower resolution ones, and the 3D graphics overlays may be replaced with higher-resolution files for increased accuracy once the data is available.

The process according to various embodiments may generate a collection of files (i.e., the Tileset), an example representation of which is illustrated in FIG. 1A. As used herein, the term "Tile" refers to a single element in the hierarchical structure of a Tileset.

A Tile in various embodiments may model a small rectangular region of the world, usually overlapping one or more of the Height Source, and may be aligned with a Background Grid. The term "Background Grid" as used herein refers to a mathematical grid structure defined in a Common Coordinate System (i.e., a coordinate system shared by every Tileset). The Background Grid may be viewed and/or shared in two forms: a Sample Grid, in which each cell represents a single sample of height data, and a higher-level Tile Grid, in which each cell represents a single Tile.

The terms "Leaf," "Leaf Node," and "Leaf Tile" are interchangeably used herein to refer to a node at the bottom-most level of the Tileset hierarchy, and which represent full-resolution data for accurate calculations. The term "Layout" as used herein refers to an intermediary data structure used to construct the Tileset, and which provides both a hierarchical view and a grid view of the Tiles (including LOD).

The terms "Root Node" and "Root Tile" are used interchangeably herein to refer to a Tile at the top of a Tileset hierarchy, and which represents a summary of the entire Tileset in a single Tile. The terms "Interior Node" and "Interior Tile" are used interchangeably herein to refer to a Tile that is not at the bottom-most level of the Tileset hierarchy, and which represent lower-resolution data for coarser views of the data/better 3D graphics performance.

In various embodiments, a Tile may have a set of tile coordinates relative to a bottom left Leaf Tile of the Layout. Such coordinates may be expressed as (height, row, column), with the height representing the number of levels above the Leaf Nodes, and row and column representing the number of tiles relative to the bottom left tile of the given height.

Figure 1B:
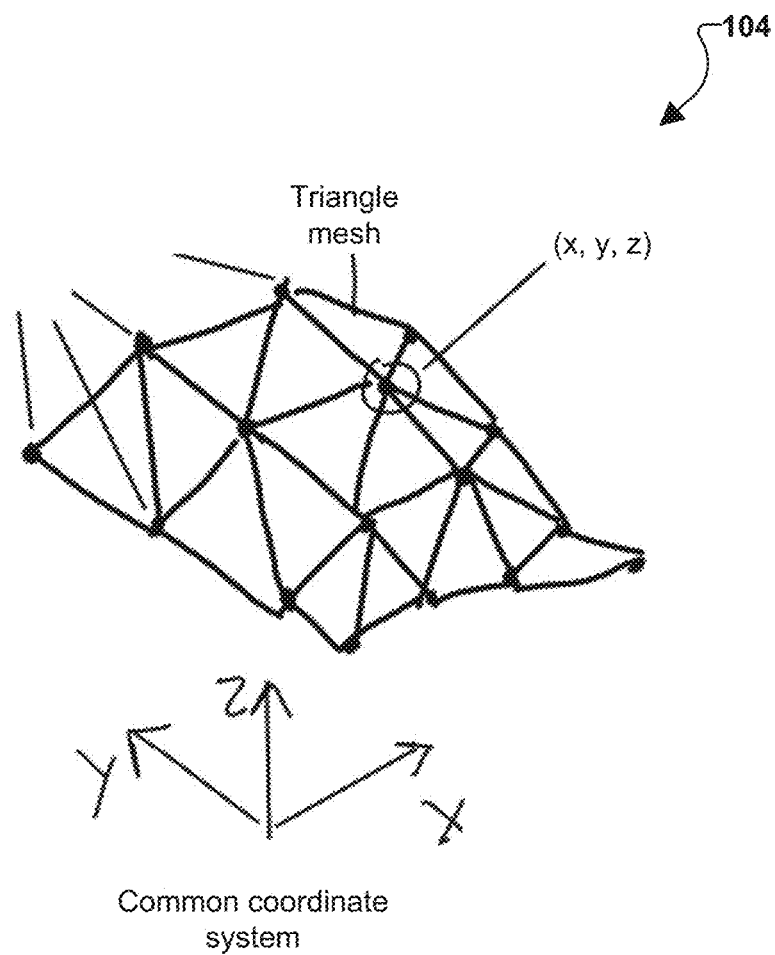
FIG. 1B illustrates an example representation of data in the Geometry for the Tile 100 of FIG. 1A.
Figure 1C:
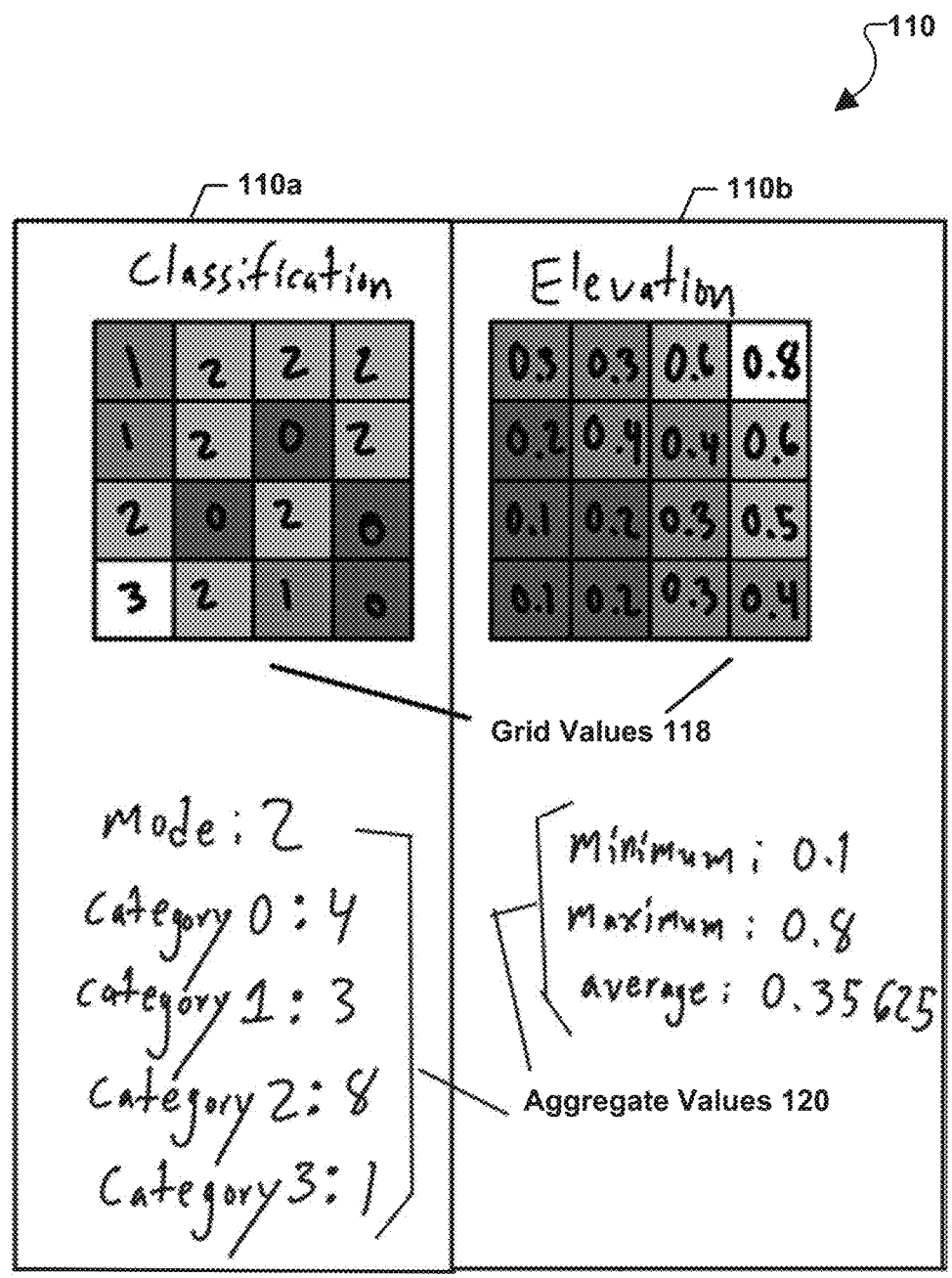
FIG. 1C illustrates an example representation of data in the Measurements for the Tile 100 of FIG. 1A.

Each Tile in the various embodiments may contain data in multiple formats. FIGS. 1A-1C illustrate the data that make up an example Tile 100. Since the data is derived from the Height Source, the Tile 100 may contain one or more Height Array 106 that has all of the height samples from the Height Source that intersects the Tile 100. For samples that do not have height data, a special No Data value may be stored in place of a height.

Each Tile will eventually be rendered in a 3D graphics program, and therefore may include Geometry data (e.g., 104), as shown in FIG. 1B. In various embodiments, the Geometry data 104 may include vertices (one at the center of each sample), texture coordinates, and other data such as face normals for use in lighting the model. The (x,y) coordinates may be from the Sample Grid, while the value of z may be sampled from the main Height Source, all of which are discussed in further detail below.

Example representations of the Measurements that may be included in each Tile (e.g., 100) are shown in FIG. 1C. In various embodiments, Measurements 110 may include Grid Values 118 that include Textures or custom Vertex Attributes (e.g. elevation or slope at each sample, classification of each sample, etc.) as well as individual numbers for Aggregate Values 120 (e.g. net volume, average elevation, minimum slope).

Figure 2A:
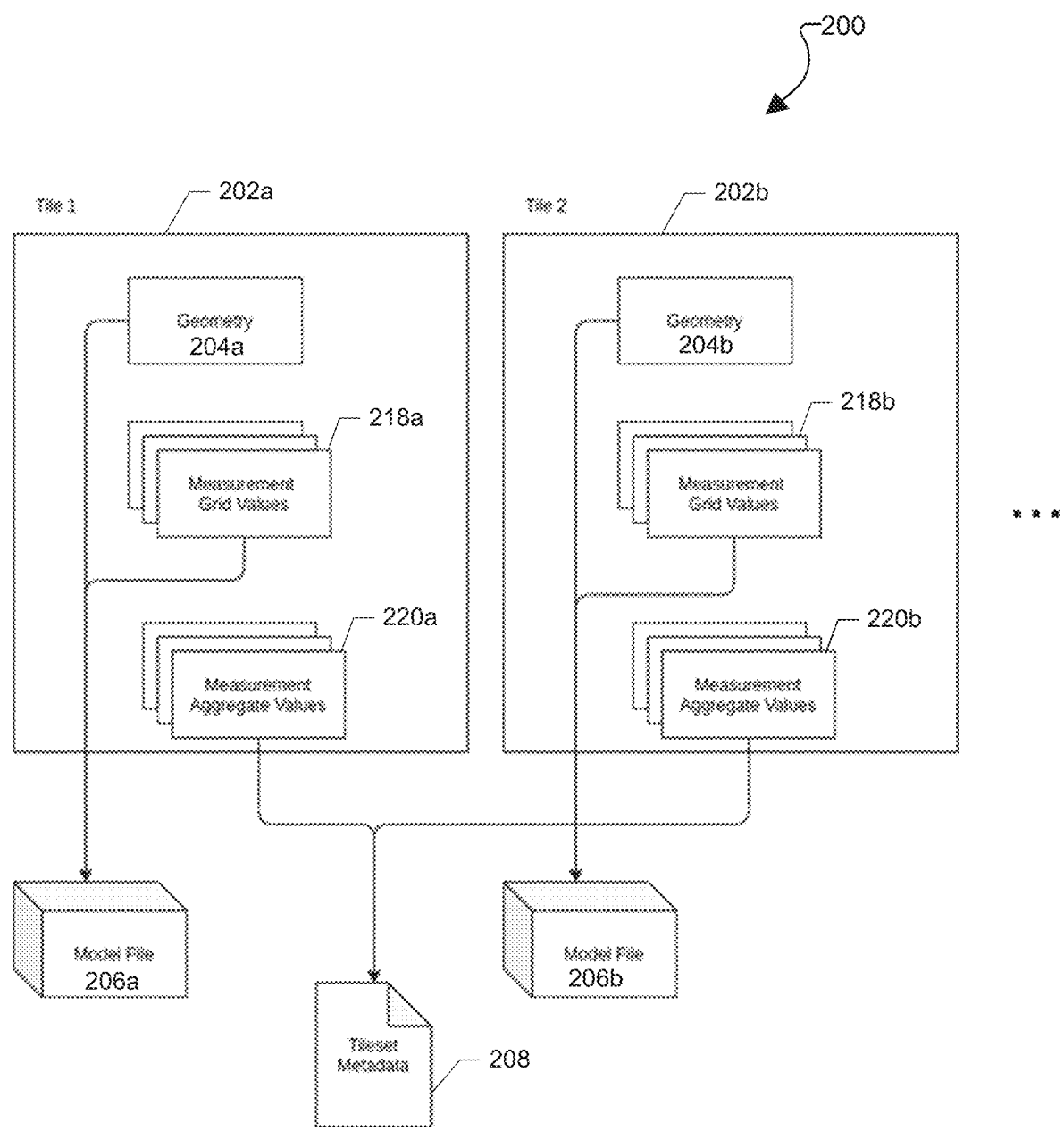
FIGS. 2A and 2B illustrate storage of data representing two example Tiles according to various embodiments.

While the values for a particular Tile (e.g., 100) may be stored as a single object in memory, they may be stored as differently on disk, as shown in FIG. 2A with respect to example Tiles 1 and 2 of Tileset 200. Specifically, larger values, such as Height Arrays 106, Geometry 204a, 204b, and Measurement Grid Values 218a, 218b for each Tile 202a, 202b may be stored in a Model File 206a, 206b. The term "Model File" as used herein refers to a digital file used for storing a 3D model of a single Tile.

Further, in various embodiments an Index File may organize the Model Files 206a, 206b for the Tiles in the Tileset 200 into a hierarchical structure. Since 3D models may be relatively large, they are not optimal for searching for Aggregate Values quickly. Therefore, the Measurement Aggregate Values 220a, 220b for the Tileset 200 may be stored in a Metadata File 208 according to various embodiments, thereby allowing quick access to the calculation summaries without loading any model files.

Figure 2B:
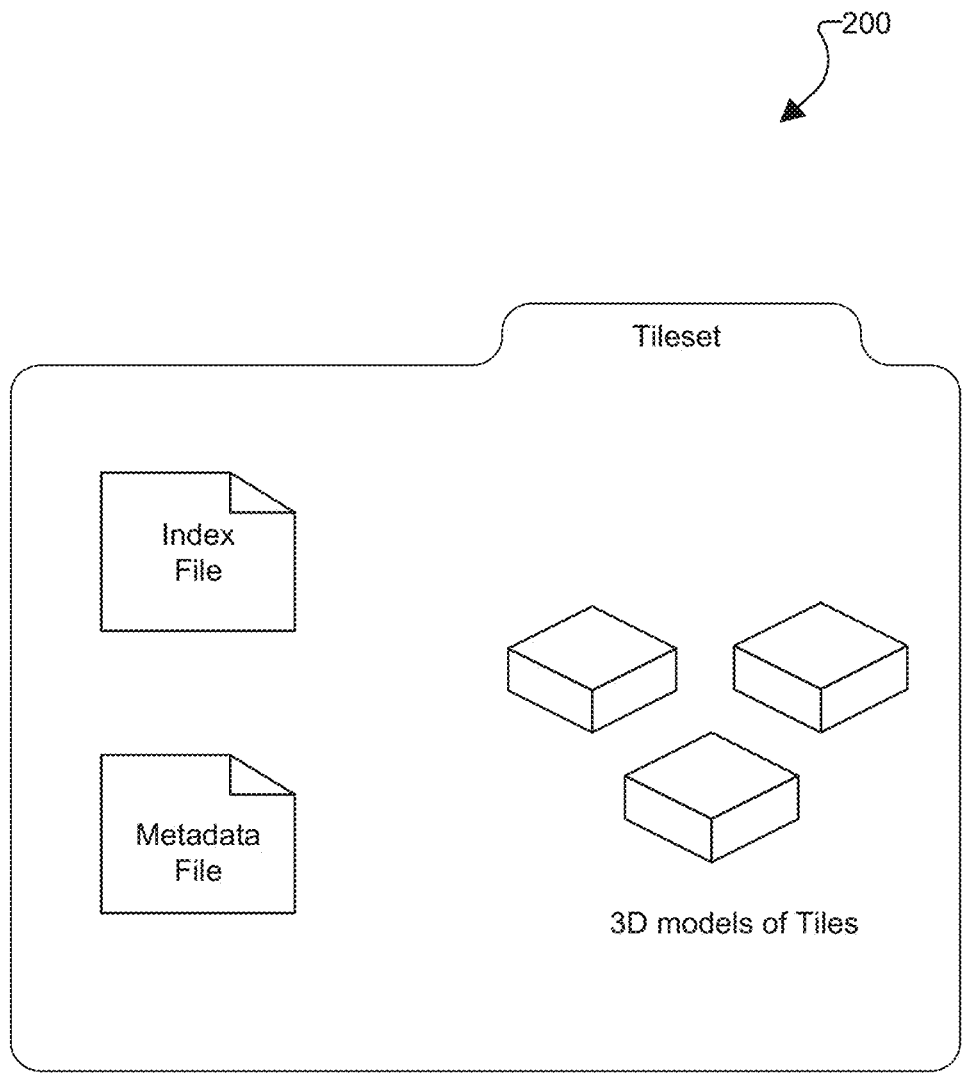

In various embodiments, a Metadata File may be separate from the Index File, while in other embodiments, the Index File may be combined with the Metadata File, depending on the use case. The Tileset may be generated as the collection of the Metadata File, Index File (if different from the Metadata File), and the model files, together in one directory. Another example representation of a Tileset, including an Index File and a Metadata File, is shown in FIG. 2B.

Figure 3:
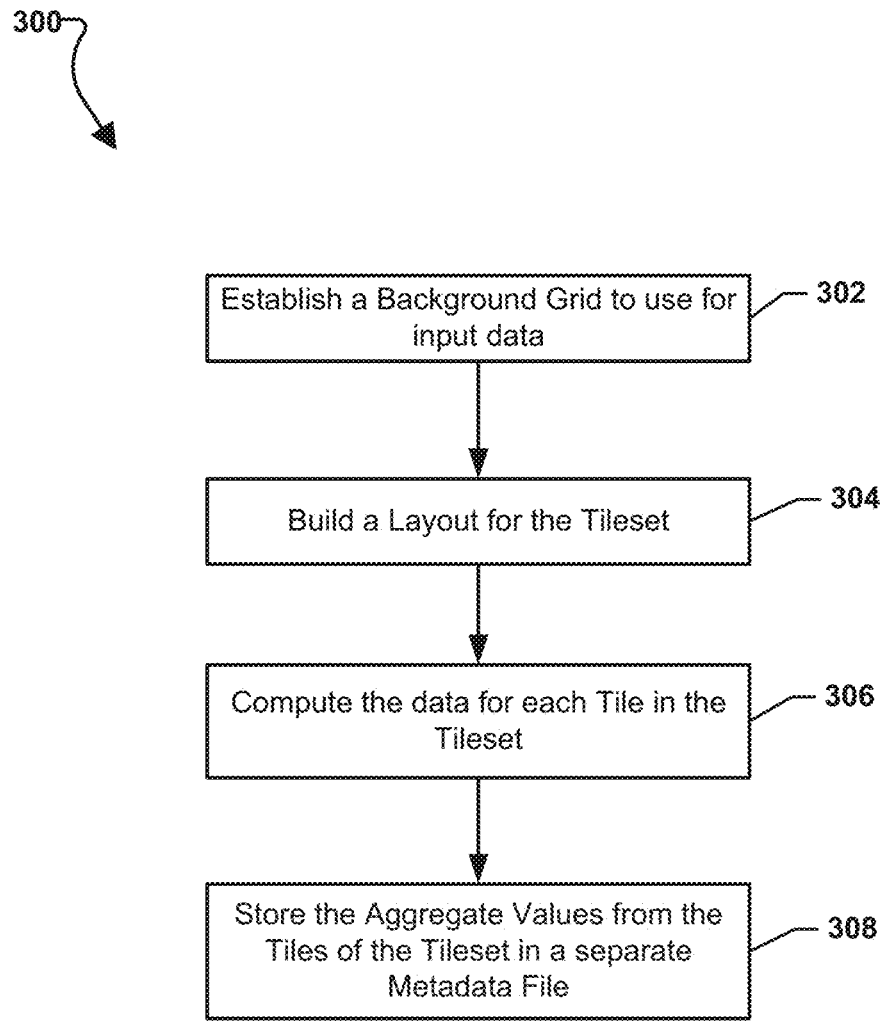
FIG. 3 is a process flow diagram illustrating an embodiment method for generating a Tileset structure for a dataset according to various embodiments.

FIG. 3 illustrates an embodiment method 300 for generating a Tileset for a dataset according to various embodiments. In various embodiments, the operations of method 200 may be performed by a component of a computing device, such as a CPU, graphics processing unit (GPU), etc. The operations of method 300 may produce a Tileset data structure that may enable the dataset to be easily accessed as well as rendered on a display.

Figure 4:
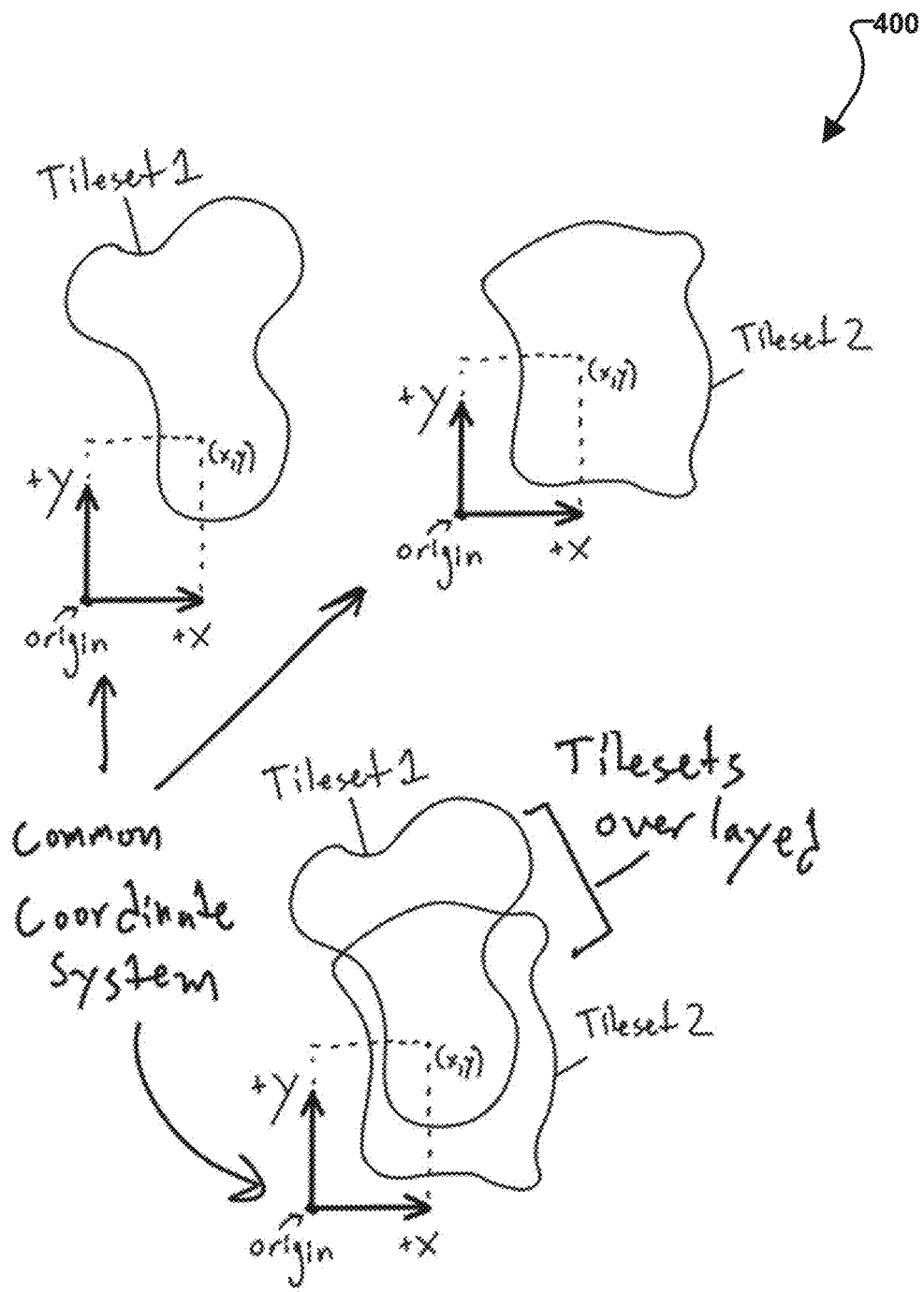
FIG. 4 illustrates an example representation of Tilesets using a Common Coordinate System according to various embodiments.

In block 302, the computing device may establish a Background Grid to use for the input data. In various embodiments, the Background Grid need only need to be established once, as subsequent runs of the method 200 should use the same Background Grid. In various embodiments, the Background Grid may be based on a Common Coordinate System for all Tilesets that will be used together in the same application. In this manner, samples of separately computed Tilesets will be aligned to the same grid, as shown in the example Tilesets 1 and 2 represented in FIG. 4.

In some embodiments, the Common Coordinate System may be a rectangular coordinate system to maximize accuracy of calculations. In other embodiments, a curved coordinate system (e.g., the WGS84 ellipsoidal coordinate system) may be used.

As an example, a Background Grid may be computed in a curved WGS84 ellipsoidal coordinate system with (longitude, latitude, height) coordinates, hereafter referred to as Cartographic Space. For example, the Background Grid may be defined by choosing an origin on the globe, and the spacing between samples in both the longitude and latitude. In an embodiment, the origin may be chosen near the center of the input data in order to minimize distortion due to curvature. The spacing between grid cells may be described as angles (deltaLongitude, deltaLatitude), as the distance between samples varies due to the ellipsoidal shape of the globe. However, on small scales, the grid may be approximately rectangular, and the deltaLongitude and deltaLatitude angles may be chosen such that grid cells near the origin are as close to squares as possible.

In an embodiment, a Background Grid with square cells may be established by measuring measure grid cells in a local plane coordinate system, and converting the measurements to Cartographic Space to compute the sample spacing, as provided in example Schema 1 below:

```
// originCartographic = (longitude, latitude)
// sampleSize = spacing between samples in a
local coordinate system. e.g. 0.5m
computeBackgroundGrid(originCartographic, sampleSize):
   // Compute the first grid cell in a local coordinate system
   originLocal = projectPoint(originCartographic)
   eastLocal = originLocal + (sampleSize, 0)
   northLocal = originLocal + (0, sampleSize)
   // Convert to cartographic and measure the difference in angle.
   eastCartographic = unprojectPoint(eastLocal)
   northCartographic = unprojectPoint(northLocal)
   deltaLongitude = eastCartographic.longitude -
originCartographic.longitude
   deltaLatitude = northCartographic.latitude -
originCartographic.latitude
   // BackgroundGrid
   return {
     origin,
     deltaLonLat: (deltaLongitude, deltaLatitude),
   }
```

In various embodiments, the Background grid may be viewed as a fine-grained view of the grid of samples, that is, a Sample Grid. In some embodiments, a coarser view of the data may be used by grouping the samples into larger cells (i.e., Tiles), providing a Tile Grid. In various embodiments, the size of a single Tile in the Tile Grid (i.e., the number of samples in each tile) may be consistent.

Figure 5A:
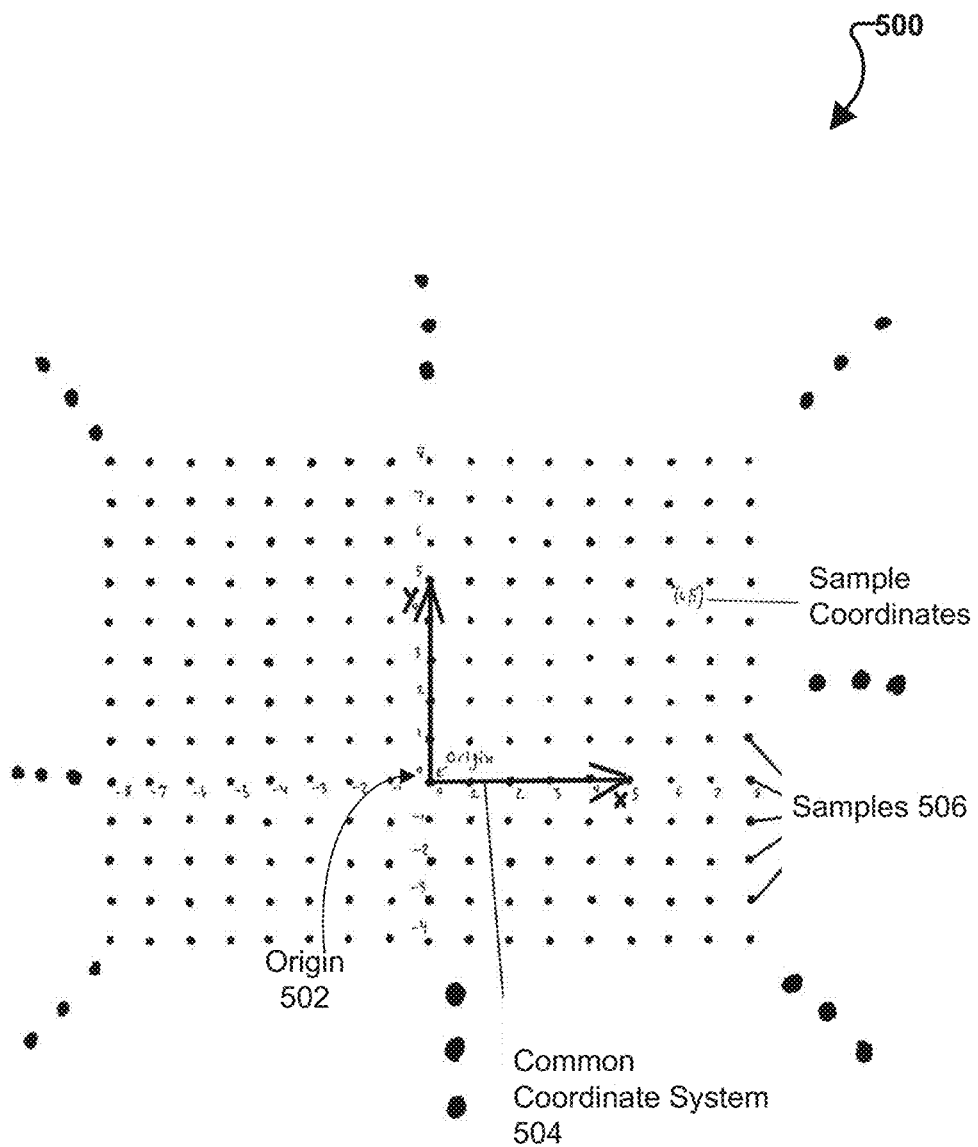
FIG. 5A illustrates an example Sample Grid the space represented by a dataset according to various embodiments.
Figure 5B:
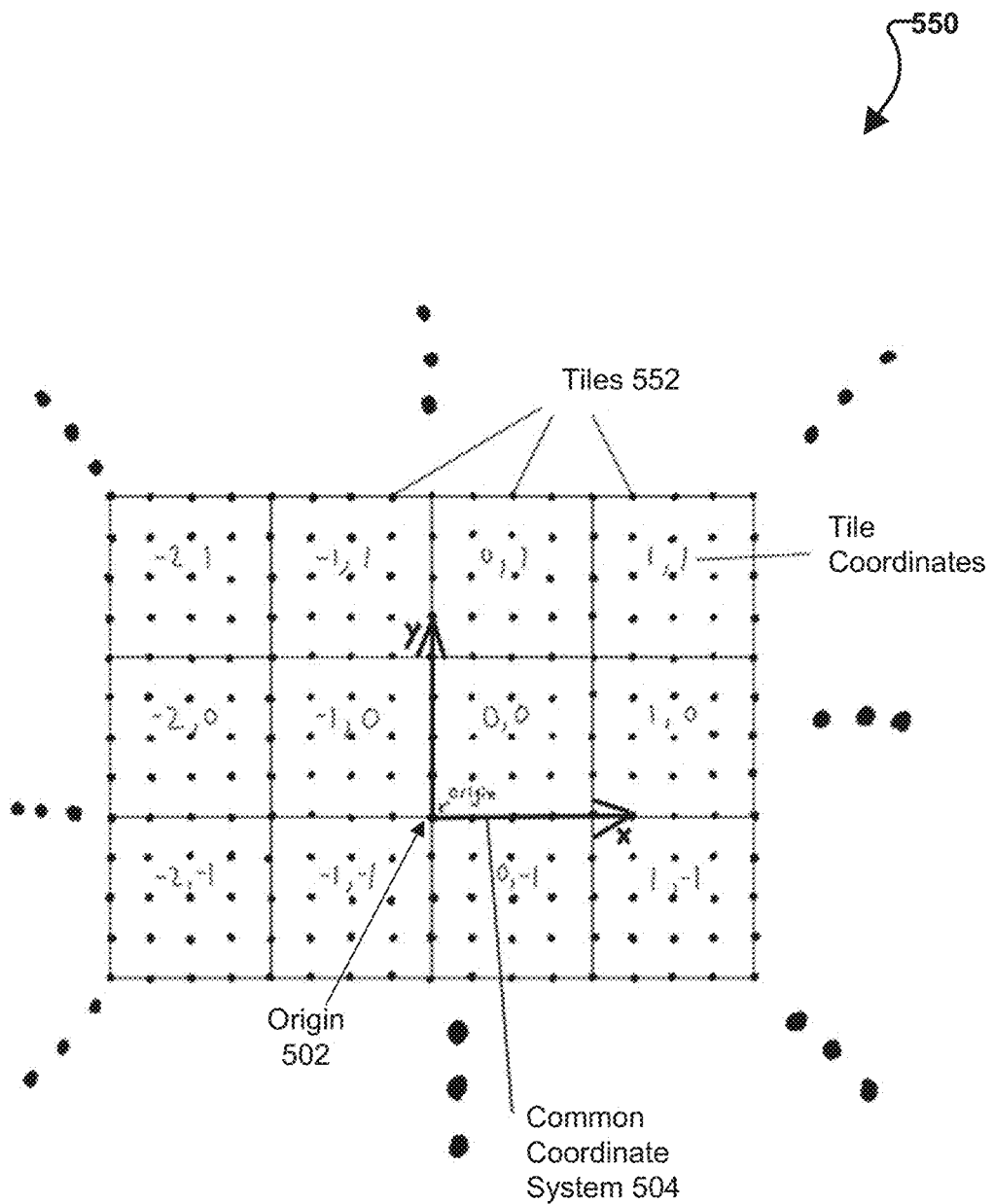
FIG. 5B illustrates an example Tile Grid for the space represented by a dataset according to various embodiments.

Representations of a Sample Grid and Tile Grid are illustrated in FIGS. 5A and 5B, respectively. In particular, the Sample Grid 500 and the Tile Grid 550 each include an Origin 502 and Common Coordinate System 504. The samples 506 that make up the Sample Grid 500 each have a set of sample coordinates, while the Tiles 562 that make up the Tile Grid 550 each have a set of tile coordinates.

Returning to FIG. 3, in block 304, the computing device may build a Layout for the Tileset. In various embodiments, building the Layout may determine the spatial extent and structure of the Tileset, creating empty Tiles and arranging them in a grid view and a hierarchical view. Specifically, the Layout may enable the computing device to store Tiles that intersect input Height Sources.

Figure 6A:
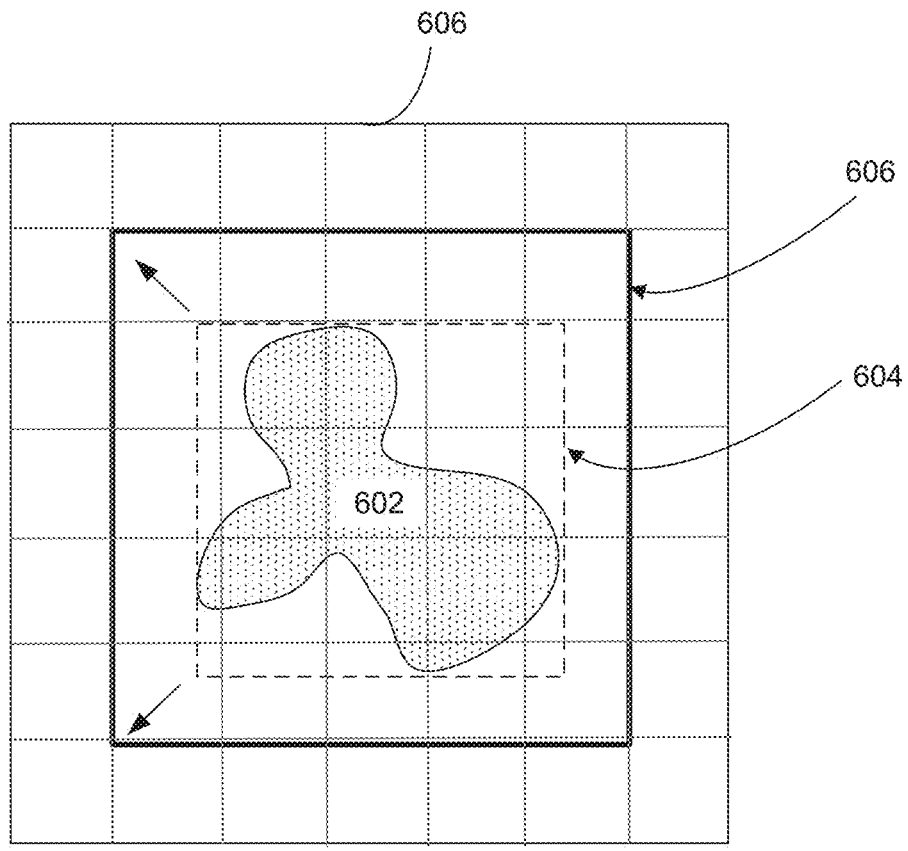
FIGS. 6A and 6B illustrate example spatial representations used to construct a Layout in generating a Tileset according to various embodiments.

In particular, as shown in FIG. 6A, creating the Layout may involve computing a bounding rectangle 602 around a main Height Source 604 in the Common Coordinate System. In order to align the rectangle 602 with the Background Grid, the rectangle 602 may be expanded until it coincides with the Tile Grid 506. In this manner, an expanded bounding rectangle 608 is created that contains a whole number of Tiles in both directions. The expanded bounding rectangle 508 may be divided into its consistent Tiles, which may be used as the Leaf Tiles of the Tileset. In particular, such Tiles (also referred to as a "Leaf Grid") are full-resolution and provide the most accurate representation of the data stored.

Figure 6B:
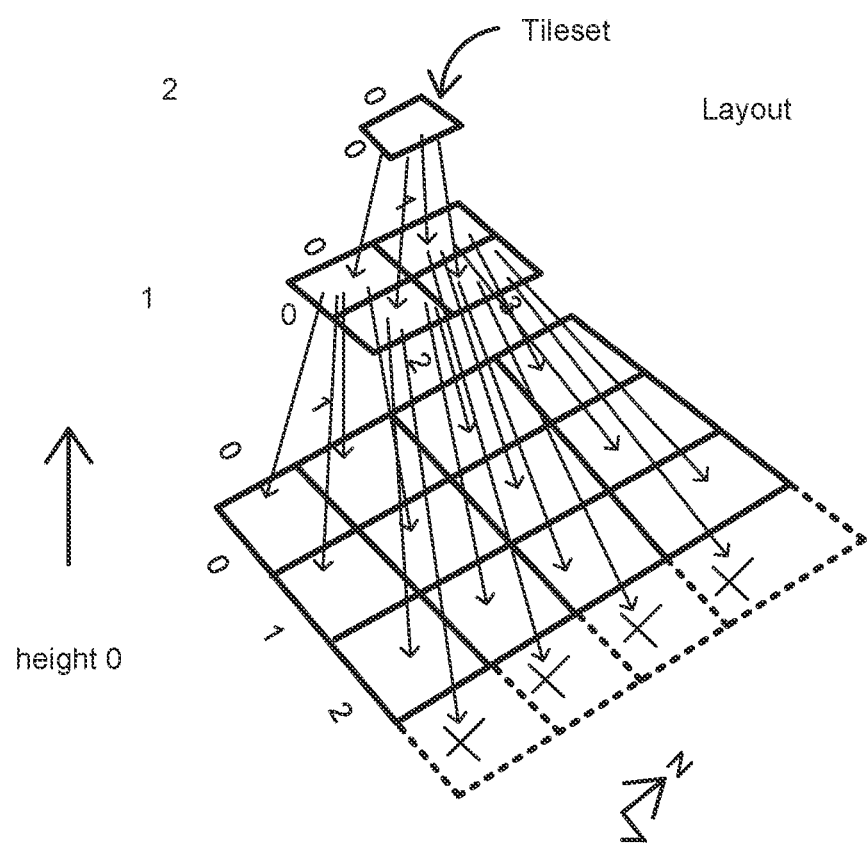

Creating the Layout in block 304 may further include an iterative process of planning higher levels. For example, the Leaf Grid may be divided into 2×2 groups (i.e., 4 tiles total per group), and a new Tile may be created per group, thereby forming a smaller array of Tiles to point to the Tiles in the Leaf Grid. This grouping process may be repeated by gathering the new Tiles into 2×2 groups and producing new, smaller parent layers until a final 1×1 grid is created. An example of such iterative grid that makes up the Layout for a Tileset is shown in FIG. 6B.

In various embodiments, the single Tile of the 1×1 grid may be the root tile for the Tileset, and all other Tiles may be accessed by following the pointers in each node (i.e., each new Tile layer). In various embodiments, a pointer to the root tile as well as to the arrays of Tiles may be stored. In particular, in various embodiments the root tile pointer may be used to traverse tree, while the arrays may be used in computations that involve the position of tiles relative to each other or the Background Grid. In various embodiments, each array of Tiles may represent a different Level of Detail of the Tileset—bottom (i.e., the Leaf Grid) is full resolution, while layers higher up in the hierarchy provide progressively coarser representations of data. While the array is smaller at higher Levels of Detail, Interior Tiles have twice the dimensions of the Tiles at the level below, as they may represent a spatial extent larger than the Leaf Grid. That is, the root Tile may be the largest of the tiles, and the goal of this arrangement is to keep the number of samples per tile consistent.

Returning to method 300, in block 306 the computing device may compute the data for each Tile in the Tileset. Computing the data for each tile may involve, for example, computing Height Arrays, computing Geometry using the Height Arrays, and Computing Measurements (e.g., Grid Values and Aggregate Values). These computations are performed with respect to both Leaf Tiles and Interior Tiles.

Figure 7:
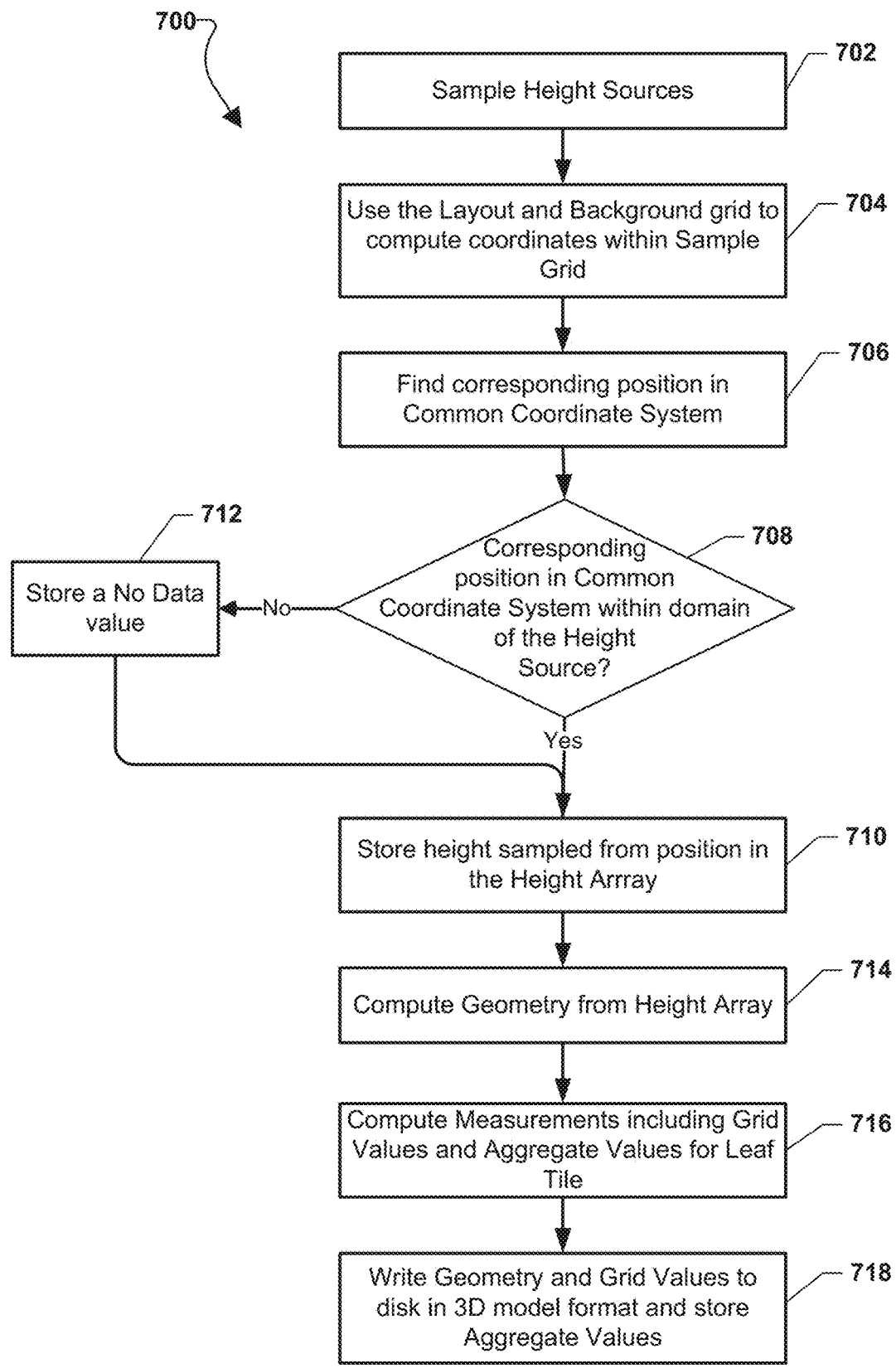
FIG. 7 is a process flow diagram illustrating an example method for performing the step of computing data for each Tile shown in block 306 of FIG. 3.

An example method for performing block 306 with respect to a Leaf Tile is illustrated in FIG. 7. With reference to FIGS. 1A-7, the operations of method 700 may be performed by a component of a computing device, such as a CPU, graphics processing unit (GPU), etc. In various embodiments, the computing device may create a Height Array for each Height Source for a given Tile.

Specifically, in block 702, the computing device may sample the Height Sources. In block 704, computing device may use the Layout and the Background Grid to compute the coordinates within the Sample Grid for a sample. In block 706, the computing device may find the corresponding position in Common Coordinate System for a sample. The computing device may determine whether the corresponding position for a sample is within the domain of the Height Source in determination block 708.

In response to determining that the corresponding position for the sample is within the domain of the Height Source (i.e., determination block 708="Yes"), the computing device may store the height sampled from the position in the Height Array in block 710. In response to determining that the corresponding position for the sample is not within the domain of the Height Source (i.e., determination block 708="No"), a No Data value may be stored in the Height Array in block 712. In various embodiments, the operation of blocks 704 through 708 may be performed with respect to each sample.

In block 714, the computing device may compute a Geometry from the Height Array. For example, vertices may be computed from the sample position in the Common Coordinate System with the height from the Height Array. If the height was No Data, the corresponding vertex may also be marked as No Data. The vertices may be tessellated as a grid, and Texture coordinates, normals, and other Vertex Attributes may also be computed.

In block 716, the computing device may compute Measurements including Grid Values and Aggregate values for the Leaf Tile. The Grid Values and Measurement Values may be computed simultaneously in some embodiments. In particular, at each sample within a 2D grid of sample, a height from each Height Array may be read. The heights read may be mathematically combined to compute a single Grid Value for the sample. In various embodiments, the mathematical combination may depend on the particular Measurement. Examples include, but are not limited to, computing height difference at each sample as part of computing volume between surfaces, or summing heights to compute total rainfall at a point over several days. In various embodiments, Aggregate Values may be computed by mathematically combining all the Grid Values of the Tile into numbers that summarize the data, Examples may include, but are not limited to, computing total area by summing the area of each sample in the grid, computing volume by multiplying these areas by height values, computing minimum, maximum or average heights.

In block 718 the computing device may write the Geometry and the Measurements' Grid Values to disk in a 3D model format, while the Measurements' Aggregate Values are stored in memory for later use in creating the Metadata File.

As discussed herein, generally tiles with less detail may be higher in a hierarchical LOD (e.g., closer to the top of the hierarchy), while tiles with more detail may be further down in the hierarchical LOD (e.g., towards the bottom of the hierarchy). As there may be more detail in the tiles further down in the hierarchical LOD and there are more tiles further down in the hierarchical LOD, tiles further down in the hierarchical LOD may be referred to as "children tiles" in relation to the tiles with less detail at higher levels in the hierarchical LOD.

For Interior Tiles (i.e., in levels above the Leaf Grid), computing the data for each Tile in block 306 of method 300 may be performed by combining the results of the Interior Tile's constituent array (i.e., children tiles from a lower level). Specifically, for Height Arrays and Geometry, the grids are arranged in a larger 2×2 grid. Wherever a child Tile is missing, use a grid of No Data values in its place. This block is then reduced in size by a factor of two by some averaging process. Much like shrinking an image, there are several ways of doing this. Some examples include, but are not limited to, averaging every 2×2 samples or using a Gaussian blur filter.

Computing Measurements for Interior Tiles may also include Grid Values and Aggregate Values. Specifically, to compute a Grid Value for an Interior Tile, the corresponding Grid Values may be arranged from the four children into a larger 2×2 grid (including No Data values). Taking every 2×2 group of samples, a combined value may be calculated. Examples may include, but are not limited to, summing areas and volumes, or averaging heights.

Figure 8:
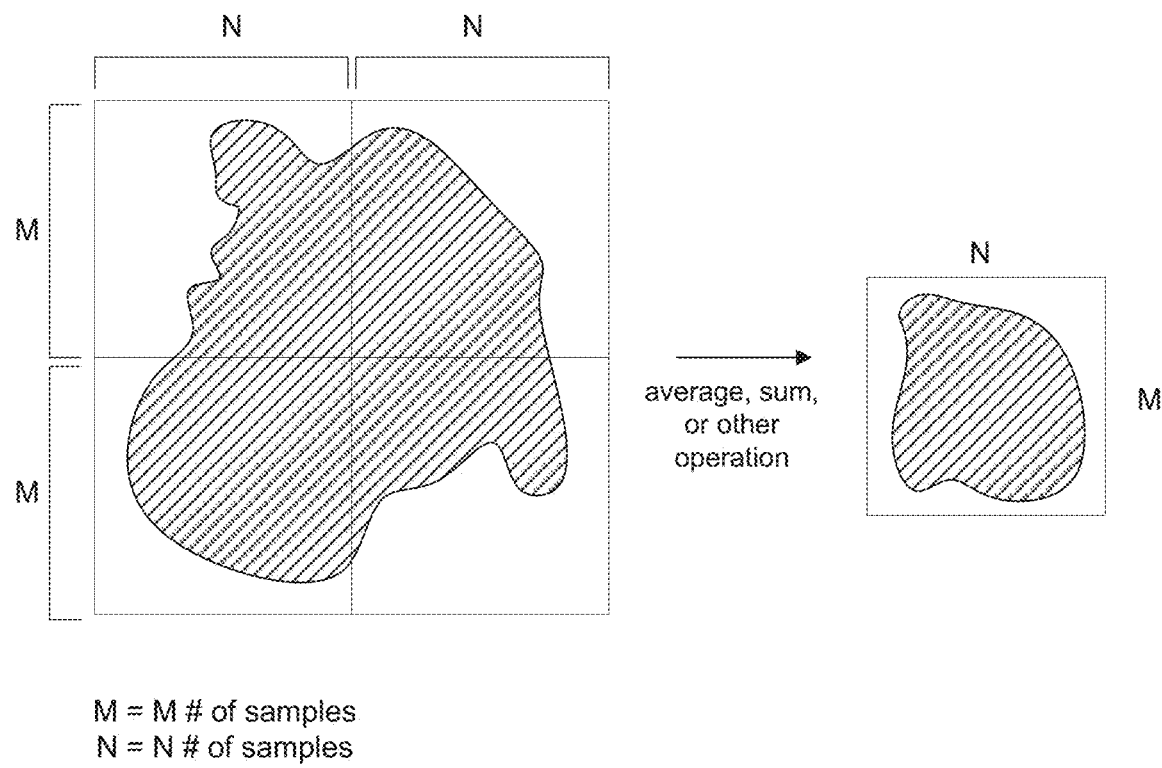
FIG. 8 illustrates an example representation of data used to compute Interior Tiles in various embodiments.

In various embodiments, the Aggregate Values of the children may be mathematically combined. A representation of a Grid Value group and computation of Aggregate Values for an example Interior Tile is shown in FIG. 8. In some embodiments, Aggregate Values may instead be computed by aggregating all of the combined Grid Values. In various embodiments, these computations may be repeated at every Interior Tile level up to the Root Tile. At the Root Tile, the Aggregate Values may represent values computed from all the samples in the Tileset, allowing quick access to totals and averages.

Since Interior Tiles depend on the values of the lower level Tiles (i.e., "children"), Tiles in lower layers typically should be computed before values in higher layers. However, some Measurements may impose further dependencies between a neighboring Tiles. For example, some calculations may use a convolutional kernel filter (e.g. slope measurements) and therefore may require input of a number of neighboring samples. For samples at the edge of a Tile, data from neighboring Tiles may be required for accurate computation. to compute this accurately, thereby imposing more dependencies in order to compute Measurements.

A number of possible implementations may make use of the different views of the data defined in the Layout. A first example may be a depth-first traversal with computations done in post order. In such example, Leaf Tiles may be computed immediately, while Interior Tiles are only computed after computing their 1-4 constituent/children Tiles. Once the values for the constituent Tiles have been used for the Interior Tile, the constituent Tiles' Grid Values and Geometry can be cleared to conserve memory. However, in various embodiments, Aggregate Values may be kept to be later collected as metadata, discussed in further detail below. This first implementation may be beneficial where the calculations do not depend on neighbor samples.

A second example may involve computation order that uses the grid structure of the Layout to compute the grid of Leaf Tiles and write to disk. The Tiles at a first height (i.e., 1) are computed using their constituent Leaf Tiles, and the Leaf Tiles' Grid Values and Geometry may be cleared from memory. The tiles at a second height (i.e., 2) may be computed, and the Tiles at height 1 may be cleared from memory. This process, which may be viewed as a sliding window up the LOD of the hierarchical structure, may continue up until all Tiles are computed. Methods employing the computation order or a variation thereof may be necessary for calculations that require neighbor Tiles on the same level to remain in memory. Variations on these methods may also be possible. For example, computations may be divided across multiple processors or threads to make the computation faster. Furthermore, if Tiles can be saved to disk and loaded back into memory, some Tiles may be temporarily stored on disk and cleared from memory to reduce total RAM usage at a given time.

Returning to FIG. 3, the results of block 306 may be written to a file or other digital storage format. Specifically, in block 308, the computing device may store the Aggregate values from the Tiles of the Tileset in a separate Metadata file.

A main benefit of the Tileset according to various embodiments is the ability to look up computed Aggregate Values much faster than would be required to compute them directly. That is, such Aggregate Values may be computed by accessing the Metadata File, and within the Metadata file, accessing the metadata associated with the Root Tile. In various embodiments, the Aggregate Values of the Root tile represent a summary of the entire Tileset. For example, for an Aggregate Value measuring the total area, such Aggregate Value of the Root Tile will be the area of all the samples in the Tileset with area values. Likewise, for an Aggregate Value measuring the average elevation, such Aggregate Value of the Root Tile will be the average elevation over the entire Tileset. That is, unlike a direct computation, various embodiments enable accessing such information with sampling of height sources or loading of Tiles.

Figure 9:
FIG. 9 illustrates an example visual representation of a Tileset generated according to various embodiments.

Another beneficial use of a Tileset generated according to the various embodiments may be visualization. In particular, the hierarchical LOD structure may allow for efficient streaming and rendering in 3D graphics engines. In various embodiments, each Tile may be rendered with a fragment shader that may interpret the data. Many forms of display may be possible, including, but not limited to, heatmaps and other color maps, contour maps, and vector plots. For example, to generate a heatmap, Grid Values may be read (and decoded if necessary) from Texture or Vertex Attributes. Such a Grid Value may be mathematically mapped to a normalized range (e.g., between 0 and 1), and this new value may be used to pick a color from a gradient. An example of a display providing such visualization of a Tileset generated according to an embodiment in shown in FIG. 9.

In various embodiments, if two or more Tilesets use the same Background Grid and represent overlapping regions of space, Derived Measurements may be computed in the region of overlap. The use of the same Background Grid ensures that the samples of each Tileset will be aligned to the same grid for accurate computations.

In an embodiment, the region of overlap (i.e., the set of Tiles from the Background Grid that are included in both or all of the Tilesets) may be determined. In some embodiments, determining the region of overlap may be performed by intersecting bounding rectangles of each Tile's Layout, and searching this region for Tiles that exist in all of the input Tilesets. In various embodiments, such Tiles represent data that overlaps in space, and may be referred to herein be referred to as "Tile Stacks."

For each Tile Stack, a new Measurement may be computed in various embodiments. In particular, the corresponding Grid Values of each Tile in the Tile Stack may be mathematically combined at each sample. For example, height differences may be computed between two Grid Values representing elevation. However, many other measurements are possible, including but not limited to sums, products, averages, minima and maxima. With respect to Aggregate Values, some values may be combined in similar fashion (e.g. adding up volumes and areas), while other values must be computed (e.g., averages).

The resulting Aggregate Values and Grid Values may represent a "Derived Measurement." In some embodiments, the Derived Measurement may be stored in the existing Tileset as an additional layer. In other embodiments, the Derived Measurement may be stored in a new, separate Tileset in which the Geometry is derived from one of the input Tilesets.

A Tileset generated according to various embodiments may be used to compute a measurement on a smaller region of space than the original Tileset, referred to herein as a "Sub-region." In some embodiments, computing the measurement on a Sub-region may involve selecting a mathematical representation of the Sub-region. The mathematical representation, referred to herein as a "Region Mask," may be a simple rectangular region, or a more complex shape (e.g., a polygon) in various embodiments.

Computing the measurement on the Sub-region may be performed by searching the Tileset for tiles that intersect the Region Mask, and computing new Measurements for each intersecting Tile. In various embodiments, computing new Measurements may involve computing a new Grid Value for samples that are within the Region mask, and marking samples outside the Region Mask as No Data. In various embodiments, new Aggregate Values may be computed from the new Grid Values, rather than from the old Aggregate Values. Similar to the Derived Measurements, the resulting Measurements in various embodiments may be stored in an existing Tileset, or alternatively in a new Tileset.

In some embodiments, Sub-region Measurement calculations may be combined with Derived Measurement calculations, in order to compute a measurement defined in a smaller region of interest within the intersection of two Tilesets. In particular, such embodiments may involve calculations similar to the Derived Measurement calculations described above, with a Region Mask applied after computing the region In various embodiments, Leaf Tiles may not require geometry or texture simplification and may be generated from source data using processing stages including, but not limited to, clipping contained triangles to bounding boxes, generating texture atlases only containing texture information needed by the leaf, and/or data postprocessing and improvement. Data postprocessing and improvement may include, but are not limited to, vertex reordering for post-vertex transform cache efficiency, geometry compression, and/or texture compression or re-encoding.

In various embodiments, the determination of Leaf Tiles based on the hierarchy of bounding boxes may also be performed in parallel, such as over multiple computing devices (e.g., multiple CPUs, GPUs, etc.), multiple cores, etc., by generating different batches of candidate leaf tiles on each available computing device, core, etc.

Figure 10:
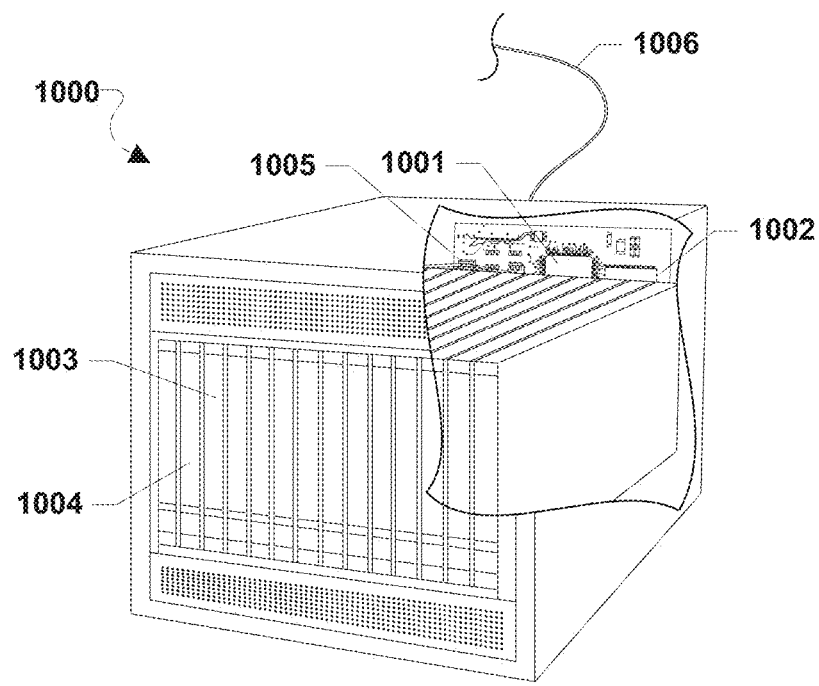
FIG. 10 is a component block diagram of a server that is a computing device suitable for use in the various embodiments.

The various embodiment methods may be performed partially or completely on a variety of computing devices, such as a server. Such embodiments may be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1005 coupled to the processor 1001 for establishing data connections with a network 1006, such as a local area network coupled to other broadcast system computers and servers. The processor 1001 may be any programmable microprocessor, microcomputer or multiple processor chip or chips that may be configured by software instructions (applications) to perform a variety of functions, including the functions of the various embodiments described above. Typically, software applications may be stored in the internal memory 1002, 1003 before they are accessed and loaded into the processor 1001. The processor 1001 may include internal memory sufficient to store the application software instructions.

Figure 11:
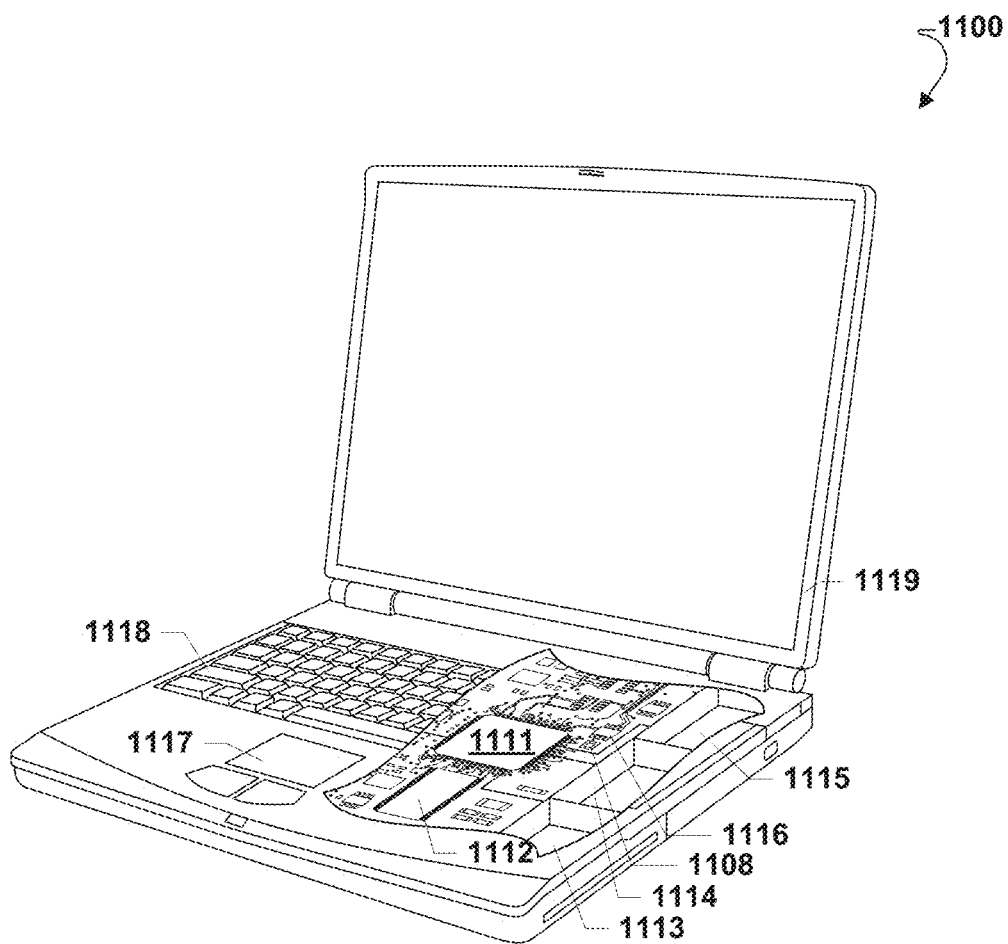
FIG. 11 is a component block diagram of a laptop that is a computing device suitable for use in the various embodiments.

The various embodiments described above may also be implemented within a variety of computing devices, such as a laptop computer 1100 illustrated in FIG. 11. Many laptop computers include a touchpad touch surface 1117 that serves as the computer's pointing device, and thus may receive drag, scroll, and flick gestures similar to those implemented on mobile computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antennas 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for generating at least one hierarchical-level-of-detail (LOD) data structure for measurement data associated with a three-dimensional (3D) model, the method comprising:

establishing a background grid comprising a mathematical grid structure defined in a common coordinate system;

building a layout comprising an intermediary data structure, wherein the layout provides a grid view and a hierarchical view of tiles, wherein each tile represents a rectangle of height data samples aligned with the background grid;

computing, for each tile, one or more measurement layer comprising calculations derived from the height data samples, wherein each measurement layer includes at least one grid of computed values and at least one aggregate value; and storing at least a portion of the computed one or more measurement layer for each tile in a metadata file, wherein the at least one hierarchical LOD data structure comprises a plurality of LOD data structures that are configured to be aligned to develop a new data structure, the method further comprising:
comparing the plurality of LOD data structures; and
computing at least one derived hierarchical LOD data structure from the plurality of LOD data structures, wherein the at least one derived hierarchical LOD data structure is the new data structure.

2. The method of claim 1, wherein the generated at least one hierarchical LOD data structure is configured to enable visualizing the one or more computed measurement layer in a 3D rendering engine.

3. The method of claim 1, wherein computing the one or more measurement layer for each tile comprises storing at least one of textures or vertex attributes for the hierarchical LOD data structure.

4. The method of claim 1, further comprising applying one or more compression techniques to the computed one or more measurement layer.

5. The method of claim 1, wherein the at least one hierarchical LOD data structure comprises two or more LOD data structures, and wherein computing the one or more measurement layer for each tile comprises computing measurements at an intersection of the two or more LOD data structures, the method further comprising:
creating a new measurement layer or a new hierarchical LOD data structure of the computed measurements at the intersection.

6. The method of claim 5, wherein computing the measurements at the intersection of the two or more LOD data structures is performed offline or at runtime.

7. The method of claim 5, further comprising combining the computed measurements at the intersection of the two or more LOD data structures with a sub-region hierarchical LOD data structure.

8. The method of 5, wherein the two or more LOD data structures are associated with different time periods.

9. The method of claim 1, further comprising, for rendering at least a portion of the 3D model:
receiving a request for calculating a measurement associated with the portion of the 3D model;
identifying one or more relevant tiles associated with the portion of the 3D model;
selecting data from texture data or vertex attributes of the identified one or more relevant tile; and
returning the selected data.

10. The method of claim 9, further comprising rendering the selected data overlaid with the 3D model.

11. The method of claim 9, wherein receiving the request, identifying the one or more relevant tile, selecting the data, and returning the selected data are performed prior to runtime for rendering the portion of the 3D model.

12. A computing device, comprising:
a processor configured with processor executable instructions to perform operations comprising:
establishing, for measurement data associated with a three-dimensional (3D) model for which at least one hierarchical level-of-detail (LOD) data structure is to be generated, a background grid comprising a mathematical grid structure defined in a common coordinate system;
building a layout comprising an intermediary data structure, wherein the layout provides a grid view and a hierarchical view of tiles, wherein each tile represents a rectangle of height data samples aligned with the background grid;
computing, for each tile, one or more measurement layer comprising calculations derived from the height data samples, wherein each measurement layer includes at least one grid of computed values and at least one aggregate value; and
storing at least a portion of the computed one or more measurement layer for each tile in a metadata file,
wherein:
the at least one hierarchical LOD data structure comprises a plurality of LOD data structures that are configured to be aligned to develop new data structures; and
the processor is configured with processor executable instructions to perform operations further comprising:
comparing the plurality of LOD data structures; and
computing derived hierarchical LOD data structures from the plurality of LOD data structures, wherein the derived hierarchical LOD data structures are the new data structures.

13. The computing device of claim 12, wherein the processor is configured with processor executable instructions to perform operations such that the generated at least one hierarchical LOD data structure is configured to enable visualizing the one or more computed measurement layer in a 3D rendering engine.

14. The computing device of claim 12, wherein the processor is configured with processor executable instructions to perform operations such that computing the one or more measurement layer for each tile comprises storing at least one of textures or vertex attributes for the hierarchical LOD data structure.

15. The computing device of claim 12, wherein the processor is configured with processor executable instructions to perform operations further comprising applying one or more compression techniques to the computed one or more measurement layer.

16. The computing device of claim 12, wherein:
the at least one hierarchical LOD data structure comprises two or more LOD data structures
the processor is configured with processor executable instructions to perform operations such that computing the one or more measurement layer for each tile comprises computing measurements at an intersection of the two or more LOD data structures; and
the processor is configured with processor executable instructions to perform operations further comprising creating a new measurement layer or a new hierarchical LOD data structure of the computed measurements at the intersection.

17. The computing device of claim 16, wherein the processor is configured with processor executable instructions to perform operations such that computing the measurements at the intersection of the two or more LOD data structures is performed offline or at runtime.

18. The computing device of claim 16, wherein the processor is configured with processor executable instructions to perform operations further comprising combining the computed measurements at the intersection of the two or more LOD data structures with a sub-region hierarchical LOD data structure.

19. The computing device of claim 16, wherein the processor is configured with processor executable instructions to perform operations such that the two or more LOD data structures are associated with different time periods.

20. The computing device of claim 12, wherein the processor is configured with processor executable instructions to perform operations further comprising, for rendering at least a portion of the 3D model:
  receiving a request for calculating a measurement associated with the portion of the 3D model;
  identifying one or more relevant tiles associated with the portion of the 3D model;
  selecting data from texture data or vertex attributes of the identified one or more relevant tile; and
  returning the selected data.

21. The computing device of claim 20, wherein the processor is configured with processor executable instructions to perform operations further comprising rendering the selected data overlaid with the 3D model.

22. The computing device of claim 20, wherein the processor is configured with processor executable instructions to perform operations such that receiving the request, identifying the one or more relevant tile, selecting the data, and returning the selected data are performed prior to runtime for rendering the portion of the 3D model.

23. A non-transitory processor-readable storage medium having stored thereon processor-executable instructions configured to cause a computing device processor to perform operations comprising:
  establishing, for measurement data associated with a three-dimensional (3D) model for which at least one hierarchical level-of-detail (LOD) data structure is to be generated, a background grid comprising a mathematical grid structure defined in a common coordinate system;
  building a layout comprising an intermediary data structure, wherein the layout provides a grid view and a hierarchical view of tiles, wherein each tile represents a rectangle of height data samples aligned with the background grid;
  computing, for each tile, one or more measurement layer comprising calculations derived from the height data samples, wherein each measurement layer includes at least one grid of computed values and at least one aggregate value; and
  storing at least a portion of the computed one or more measurement layer for each tile in a metadata file,
  wherein:
    the at least one hierarchical LOD data structure comprises a plurality of LOD data structures that are configured to be aligned to develop new data structures; and
    the processor-executable instructions are configured to cause the computing device processor to perform operations further comprising:
      comparing the plurality of LOD data structures; and
      computing derived hierarchical LOD data structures from the plurality of LOD data structures, wherein the derived hierarchical LOD data structures are the new data structures.

24. A method for generating a derived hierarchical level-of-detail (LOD) data structure for measurement data associated with a three-dimensional (3D) model, the method comprising:
  generating at least two hierarchical LOD data structures that are configured to be aligned, wherein generating each of the at least two hierarchical LOD data structures comprises:
    establishing a background grid comprising a mathematical grid structure defined in a common coordinate system;
    building a layout comprising an intermediary data structure, wherein the layout provides a grid view and a hierarchical view of tiles, wherein each tile represents a rectangle of height data samples aligned with the background grid;
    computing, for each tile, one or more measurement layer comprising calculations derived from the height data samples, wherein each measurement layer includes at least one grid of computed values and at least one aggregate value; and
    storing at least a portion of the computed one or more measurement layer for each tile in a metadata file;
  identifying at least one region of overlap between the at least two generated hierarchical LOD data structures; and
performing, in the at least one region of overlap, further calculations using the computed one or more measurement layer from each of the at least two hierarchical LOD data structures,
wherein the derived hierarchical LOD data structure contains the further calculations.

25. A computing device, comprising:
a processor configured with processor executable instructions to perform operations for generating a derived hierarchical level-of-detail (LOD) data structure for measurement data associated with a three-dimensional (3D) model comprising:
  generating at least two hierarchical LOD data structures that are configured to be aligned, wherein generating each of the at least two hierarchical LOD data structures comprises:
    establishing a background grid comprising a mathematical grid structure defined in a common coordinate system;
    building a layout comprising an intermediary data structure, wherein the layout provides a grid view and a hierarchical view of tiles, wherein each tile represents a rectangle of height data samples aligned with the background grid;
    computing, for each tile, one or more measurement layer comprising calculations derived from the height data samples, wherein each measurement layer includes at least one grid of computed values and at least one aggregate value; and
    storing at least a portion of the computed one or more measurement layer for each tile in a metadata file;
  identifying at least one region of overlap between the at least two generated hierarchical LOD data structures; and
  performing, in the at least one region of overlap, further calculations using the computed one or more measurement layer from each of the at least two hierarchical LOD data structures,
wherein the derived hierarchical LOD data structure contains the further calculations.

* * * * *